US005929441A

United States Patent [19]

Beratan et al.

[11] Patent Number: 5,929,441

[45] Date of Patent: Jul. 27, 1999

[54] LOW MASS OPTICAL COATING FOR THIN FILM DETECTORS

[75] Inventors: Howard R. Beratan; Chih-Chen Cho, both of Richardson, Tex.

[73] Assignee: Texas Instruments Incorporated, Dallas, Tex.

[21] Appl. No.: 08/883,736

[22] Filed: Jun. 27, 1997

[51] Int. Cl.[6] .......... G01J 5/22

[52] U.S. Cl. .......... 250/338.3; 250/332; 250/338.4

[58] Field of Search .......... 250/338.4, 338.3, 250/332

[56] References Cited

U.S. PATENT DOCUMENTS

| | | | |
|---|---|---|---|
| 4,143,269 | 3/1979 | McCormack et al. . | |
| 5,021,663 | 6/1991 | Hornbeck . | |
| 5,030,827 | 7/1991 | Powell | 250/338.1 |
| 5,300,807 | 4/1994 | Nelson | 257/632 |
| 5,486,698 | 1/1996 | Hanson et al. . | |
| 5,512,748 | 4/1996 | Hanson . | |
| 5,602,043 | 2/1997 | Beratan et al. . | |
| 5,640,013 | 6/1997 | Ishikawa et al. | 250/338.4 |

*Primary Examiner*—Constantine Hannaher
*Attorney, Agent, or Firm*—W. James Brady, III; Richard L. Donaldson

[57] ABSTRACT

A thermal detector having an optical coating comprising a porous film 64. The porous film preferably comprises a xerogel or aerogel and is greater than 80% porous. An optional optical impedance matching layer 66 may be deposited over the porous film 64. Advantages include decreased thickness of the thermal sensor, improved acuity of the image produced by the system, lower manufacturing temperatures, and the ability to use electrodes that are opaque to infrared energy.

15 Claims, 3 Drawing Sheets

LOW MASS OPTICAL COATING FOR THIN FILM DETECTORS

CROSS-REFERENCE TO RELATED APPLICATIONS

The following U.S. patent applications are commonly assigned and are incorporated herein by reference:

| U.S. Pat. No. | Serial No. | Filing Date | Inventor | Title |
|---|---|---|---|---|
| 5,486,698 | 08/229,497 | 4/19/94 | | Thermal Imaging System with integrated Thermal Chopper |
| 5,512,748 | 08/281,711 | 7/26/94 | | Thermal Imaging System with a Monolithic Focal Plane Array and Method |
| 5,602,043 | 08/368,067 | 1/3/95 | | Monolithic Thermal Detector with Pyroelectric Film and Method |
| (pending) | 08/788,313 | 1/24/97 | Beratan et al. | High MTF Optical Coating for Hybrid UFPA's |

FIELD OF THE INVENTION

This invention relates generally to infrared or thermal imaging systems, and more specifically to the optical coating of thin film thermal detector sensors.

BACKGROUND OF THE INVENTION

Infrared or thermal imaging systems typically use a plurality of thermal sensors to detect infrared light radiating from a scene. Such systems are often used to detect objects (e.g. people, vehicles, and planes) and situations (e.g. fires and overheating machines), and usually process sensor signals to produce an image capable of being visualized by the human eye.

The basic components of a thermal imaging system typically include optics for collecting and focusing infrared radiation from a scene, an infrared detector having a plurality of thermal sensors for converting detected radiation to electrical signals, and electronics for amplifying and processing electrical signals for control or visualization purposes or for storage in an appropriate medium. Each sensor can represent a pixel of video displaying the thermal image.

Thermal detectors are typically comprised of a plurality of thermal sensors, creating a sensor array. The sensor array is usually electrically coupled to an integrated circuit substrate through an array of contacts. To maximize thermal isolation of the sensor array from the integrated circuit, a thermal isolation structure is often disposed between the sensor array and the integrated circuit.

Thermal sensors are sometimes comprised of a pyroelectric capacitor, wherein each pyroelectric capacitor is comprised of a thermally sensitive dielectric material between two electrodes. Infrared radiation striking the pyroelectric capacitor heats the pyroelectric material which exhibits a state of electrical polarization or change in dielectric constant in response to the incident infrared radiation. Accordingly, the electrodes operate to measure the charge generated by the pyroelectric material in response to temperature changes. The charges detected in each sensor may be amplified and processed to form a visual display.

A method of absorbing and trapping infrared radiation is necessary to allow sensors to detect incident thermal energy. Generally a cavity, with a thickness ¼ that of the wavelength of infrared radiation sought to be trapped, is established to trap the incident infrared radiation. One approach establishes a ¼ wavelength cavity between a sensor and the integrated circuit substrate. This method requires that both sensor electrodes be composed of semi-transparent metal. However, semi-transparent metal is difficult to fabricate because the thickness of the metal must be very thin and high temperatures are required to process the layer, challenging the maximum temperature of the integrated circuit.

Another method of absorbing and trapping infrared radiation involves establishing a ¼ wavelength cavity in the sensor itself by utilizing an infrared semitransparent top electrode and infrared opaque bottom electrode. However, this method requires thicker pyroelectric material between the electrodes, preventing formation of thinner pixels. Accordingly, there exists a need in the art for an improved thermal sensor and method to eliminate difficult fabrication steps and allow for the development of a thinner thermal sensor.

SUMMARY OF THE INVENTION

In accordance with the present invention, a thermal detector having an improved thermal sensor is provided that eliminates or substantially reduces the disadvantages and problems associated with prior thermal detectors.

The present invention is a thermal detector comprising a substrate, a support means, a first electrode above the substrate, a thermally sensitive element over the first electrode, a second electrode over the thermally sensitive element, an optical coating comprising a porous film over the second electrode, wherein said support means provides thermal isolation and electrical connectivity between at least the first electrode and the second electrode and the substrate.

The present invention also includes a method for fabricating a thermal detector, comprising the steps of providing a substrate, depositing a spacer-insulator material on the substrate, providing a support means, depositing a first conductor layer over the spacer-insulator layer and support means, patterning the first conductor layer to form a bottom array of electrodes, depositing a thermally sensitive layer over the electrodes, patterning the thermally sensitive layer to form thermally sensitive elements, depositing a second conductor layer over the thermally sensitive elements, patterning the second conductor layer to form a top array of electrodes, depositing a precursor film on the second conductive layer; and gelling the precursor film to form a porous film.

An advantage of the present invention is that it establishes a ¼ wavelength cavity through the use of porous film. A porous film over the top electrode of each sensor in an array solves many problems of prior art designs. The use of a porous film, the requirement that the top and bottom pyroelectric capacitor electrodes be infrared-transparent is eliminated. Therefore, the difficult fabrication steps required for a semi-transparent metal layer are eliminated. The use of a porous film results in a higher effective fill factor. Using a porous film may also not require that it be patterned.

Another advantage of the present invention is that the use of a porous film eliminates the need to control the thickness of the pyroelectric material to obtain a ¼ wavelength cavity, thereby allowing thinner pixels. Since porous film has a very low thermal mass compared to other thin films, porous film allows for a ¼ wavelength cavity without affecting performance. Thus, compared to other optical coatings, the use of porous film allows for thinner, more responsive thermal sensors due to the reduced parasitic thermal mass. Thermal budget is no longer a limitation as highly conductive electrodes are enabled.

DETAILED DESCRIPTION OF THE PREFERRED EMBODIMENTS

Figure 1:
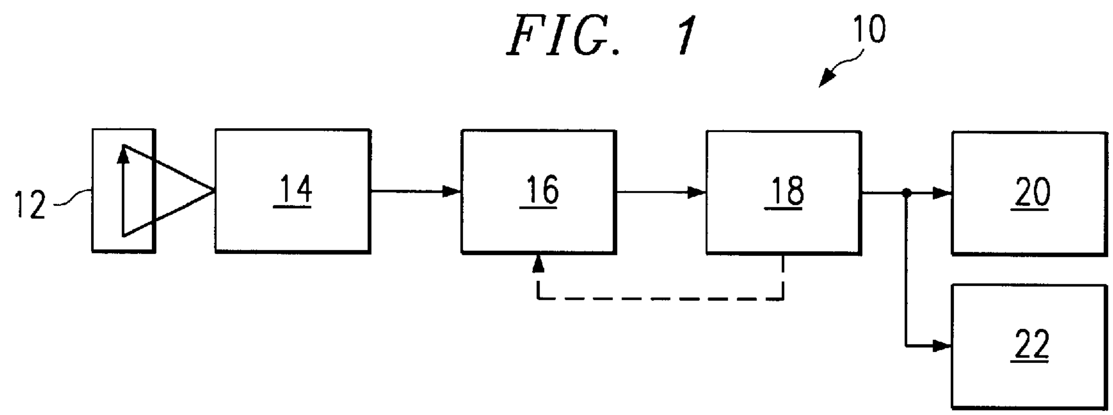
FIG. 1 is a block diagram of the components of a thermal imaging system constructed in accordance with an embodiment of the present invention.

Thermal imaging systems are useful when vision is not impaired, but are especially useful when vision is impaired by darkness, smoke, dust, or other particles. Such systems are often deployed to detect fires, overheating machinery, planes, vehicles, and people, and to control temperature sensitive industrial processes. The present invention is a thin film detector with a low mass optical coating comprising a porous film and method for manufacturing the same, which will be described below.

Table 1 below summarizes each element in the drawings and the preferred embodiments.

TABLE 1

| Drawing Element | Generic Term | Preferred or Specific Examples | Alternate Examples or Descriptions |
|---|---|---|---|
| 10 | Thermal imaging system | | |
| 14 | Lens assembly | | Optics; collection optics |
| 16 | Thermal detector | | Focal plane array 46; matrix of thermal sensors |
| 18 | Electronics | | Signal processor |
| 20 | Display | | Electronic viewfinder; cathode ray tube |
| 22 | Storage medium | | Memory device |
| 46 | Focal plane array | | Matrix of thermal sensors 48 |
| 48 | Thermal sensors | | Pyroelectric sensors; bolometers |
| 50 | Integrated circuit substrate | Silicon switching matrix | IR sensing IC, sensing integrated circuit; GaAs; readout IC; silicon; ceramic alumina |
| 52 | Contact pads | Metal alloys such as TiW or NiCr | Conductive oxides |
| 54 | Vias | | Holes |
| 56 | Contact pads | Metal alloys such as TiW or NiCr | Conductive oxides |
| 58 | Posts | Aluminum | Platinum; paliadium; W; TiW; other metals or alloys; electrically conductive material; preferably about 2.5 micrometers tall. |
| 59 | Posts | Aluminum | Platinum; palladium; W; TiW; other metals or alloys; electrically conductive material; preferably about 2.5 micrometers tall. |
| 60 | Spacer-insulator layer | Porous film | Glass; organic material; $SiO_2$; polyimide; material removable by dry etching techniques. |
| 62 | Thermally sensitive element | Barium strontium titantinate (BST); barium titantinate (BT); antimony sulfoiodide (SbSI); any lead-containing ferroelectric material such as lead titantinate (PT), lead lanthanum titantinate (PLT), lead zirconate titantinate (PZT), lead lanthanum zirconate titantinate (PLZT), lead zinc niobate (PZN), lead strontium titantinate (PSrT), or lead scandium tantalate (PST). | Thermally sensitive dielectric; pixel dielectric; pyroelectric element; thin-film sensor. |

TABLE 1-continued

| Drawing Element | Generic Term | Preferred or Specific Examples | Alternate Examples or Descriptions |
|---|---|---|---|
| 63 | Precursor film | Silica precursor film | Organometallic silicate solution; a liquid that will gel to form a $SiO_2$ or SiC xerogel or aerogel |
| 64 | Porous film | Silicon dioxide based xerogel | Silicon dioxide based aerogel; silicon carbide based xerogel; other aerogels or xerogels; preferably > 80% porosity; optical coating |
| 66 | Optical impedance matching layer | NiCr (50 Å) | Protective film; 25–5000 Å of Cermet (Cr—SiO); 25–5000 Å of Lanthanum Strontium Cobalt Oxide (LSCO); infrared transparent layer |
| 68 | Chamber | | Gap between first electrode 72 and first surface of integrated circuit substrate 50; cavity |
| 70 | First electrode | Platinum | Palladium; rhodium; NiCr; metals or alloys such as TiW, Au, 4 layer composite of In, Au, NiCr, TiW; thin film electrode; first electrically conductive element; bottom electrode; Lanthanum Strontium Cobalt Oxide (LSCO) |
| 72 | Second electrode | Platinum | Palladium; rhodium; NiCr; metals or alloys such as TiW, Au, 4 layer composite of In, Au, NiCr, TiW; thin film electrode; second electrically conductive element; top electrode; Lanthanum Strontium Cobalt Oxide (LSCO) |
| 74 | First support arm | Platinum | Palladium; rhodium; NiCr; metals or alloys such as TiW, Au, 4 layer composite of In, Au, NiCr, TiW; bifurcated support arms |
| 76 | Second support arm | Platinum | Palladium; rhodium; NiCr; metals or alloys such as TiW, Au, 4 layer composite of In, Au, NiCr, TiW; bifurcated support arms |
| 78 | Slot | | |
| 80 | Slot | | |
| 81 | First electrode contact pad | Platinum | Palladium; rhodium; NiCr; metal or alloys such as TiW, Au, 4 layer composite of In, Au, NiCr, TiW |
| 82 | Second electrode contact pad | Platinum | Palladium; rhodium; NiCr; metals or alloys such as TiW, Au, 4 layer composite of In, Au, NiCr, TiW |
| 90 | Temporary filler | Organic | Glass; porous fllm; same material as used for spacer-insulator layer 60 |
| 92 | Temporary filler | Organic | Glass; porous film; same material as used for spacer-insulator layer 60 |

As shown in FIG. 1, the thermal imaging system 10 of the present invention may comprise a lens assembly 14 in optical communication with a thermal detector 16. The lens assembly 14 focuses or directs thermal radiation emitted by scene 12 onto the thermal detector 16. The thermal detector 16 translates the incoming thermal radiation into corresponding electrical signals for processing. The lens assembly 14 may include one or more lenses made of material that transmits thermal radiation, such as germanium. The design of the lens assembly 14 may be varied depending on the particular use of the thermal imaging system 10. For example, the lens assembly 14 may have a constant or a variable F-number and/or may be a single field of view or a zoom lens. In systems where an uncooled detector 16 is used, a chopper (not shown) is often disposed between the lens assembly 14 and the thermal detector 16. Preferably, the lens assembly 14, thermal detector 16, and chopper are contained within an associated housing (not shown).

The electrical signals of the thermal detector 16 may be passed to the electronics 18, which may assemble electrical signals into video signals for display. The electronics may also synchronize operation of the chopper. This synchronization enables the electronics 18 to subtract background radiation from detected thermal radiation. The output of electronics 18 is often a video signal that may be further processed, stored in storage medium 22, or viewed on display 20, for example.

Figure 2:
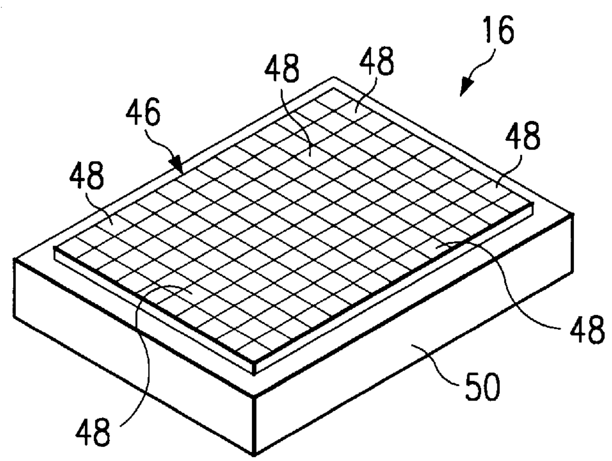
FIG. 2 is an oblique view of a focal plane array with a plurality of thermal sensors constructed in accordance with the present invention.

FIG. 2 is a detailed view of the thermal detector 16 from FIG. 1. The thermal detector 16 may comprise a focal plane array 46 mounted to an integrated circuit substrate 50. In one embodiment, the focal plane array 46 may include a number of thermal sensors 48 arranged in a matrix. The quantity and location of the thermal sensors 48 depend upon the N by M configuration desired for the focal plane array 46. Each thermal sensor 48 forms a discrete element of the focal plane array 46. The thermal sensors 48 may be reticulated to substantially reduce thermal spreading between each thermal sensor 48.

The focal plane array 46 configuration varies for different types of thermal detectors. In a "staring" thermal detector, for example, the entire thermal image is focused onto a large focal plane array. In contrast, a "scanning" thermal detector uses a mirror or similar means to sweep successive portions of the thermal image across a small focal plane array. Usually both types of thermal detectors 16 comprise of a number of thermal sensors 48, with the output of each thermal sensor 48 representing a portion of the scene 12. For example, the output of each thermal sensor 48 in a focal plane array 46 may represent a single pixel of the total image. This embodiment may be particularly beneficial for use in connection with high density visual displays.

The thermal sensors 48 may detect thermal radiation using various techniques. For example, the thermal sensors may be based upon the generation of a charge due to a change in temperature resulting from thermal radiation heating the thermal sensors 48. Alternatively, the thermal sensors 48 may be based upon the generation of a charge due to a photon-electron interaction within the material used to form the thermal sensors 48. The thermal sensors may also image thermal radiation by changing resistance of a thin conductor when heated by thermal radiation. Such thermal sensors 48 are sometimes referred to as resistive bolometers. It will be understood that these and other types of thermal sensors 48 may be used in accordance with the present invention.

Figure 3:
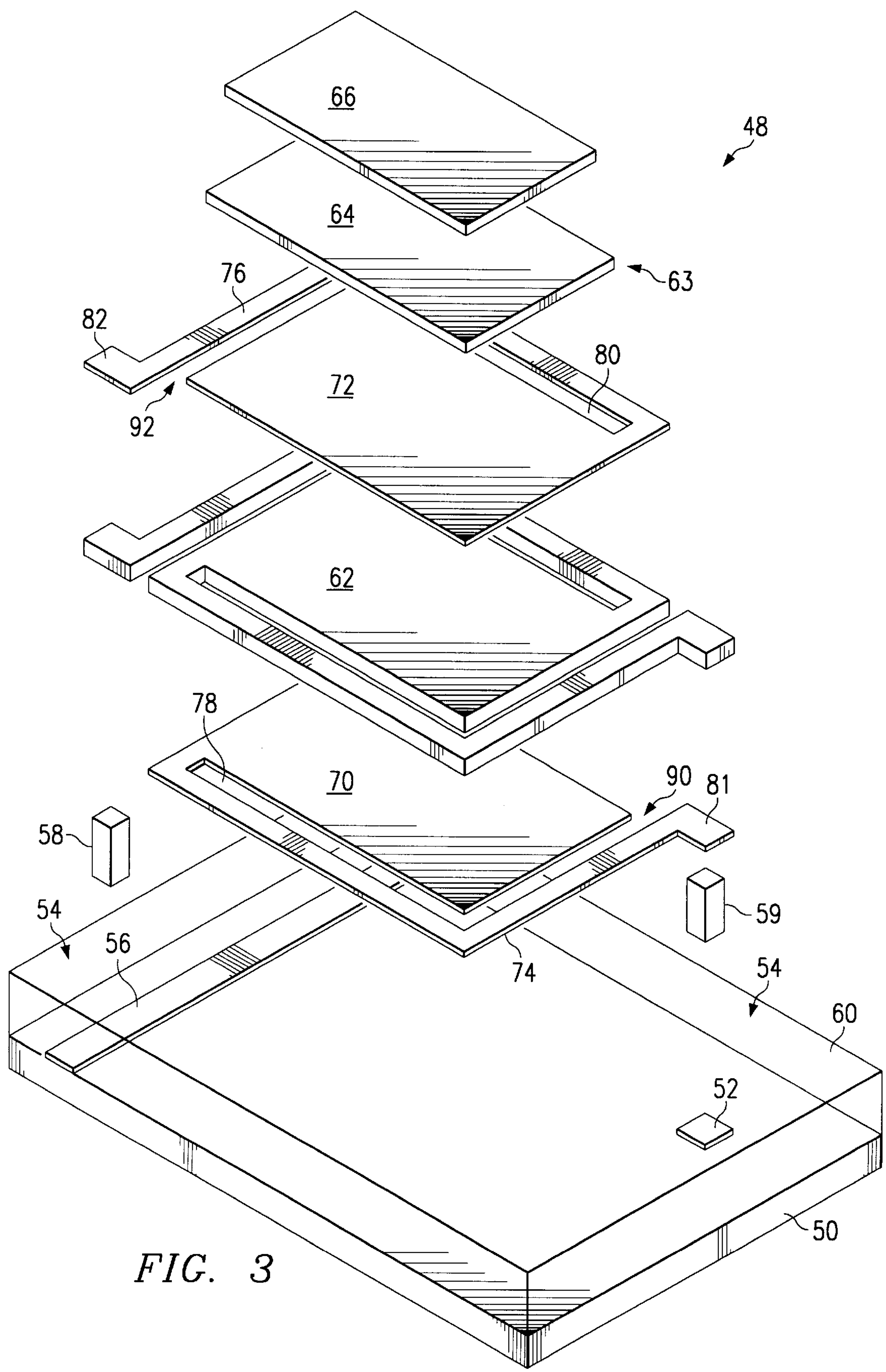
FIG. 3 is an exploded oblique view of a thermal sensor mounted on a substrate in accordance with an embodiment of the present invention.

A preferred embodiment of the structure and method of manufacturing the present invention will now be described. FIG. 3 illustrates an exploded view of the thermal sensor 48 of the present invention.

First, a substrate is provided that may be an integrated circuit substrate 50 comprising electrical couplings and circuitry to control the chopper (not shown) and to process the thermal image formed on the focal plane array 16. The integrated circuit substrate 50 may be formed of silicon, ceramic alumina, or other suitable materials which are both chemically and thermally compatible with the multiple layers which will be subsequently formed on the surface of the integrated circuit substrate 50. The integrated circuit substrate 50 temperature may be controlled with a thermal element (not shown). Maintaining a constant temperature prevents ambient or internally generated temperature fluctuations from affecting the performance of thermal sensors 48. Further information regarding thermal sensors mounted on an underlying integrated circuit substrate is disclosed by U.S. Pat. No. 4,143,269 issued to McCormack et al., entitled "Ferroelectric Imaging System" and U.S. Pat. No. 5,021,663 issued to Hornbeck, entitled "Infrared Detector." The substrate may comprise contact pads 52 and 56, as shown.

A spacer-insulator layer 60 may be deposited on the surface of the integrated circuit substrate 50. During the fabrication process, the spacer-insulator layer 60 forms a base upon which the thermal sensors 48 may be formed in space relation to the integrated circuit substrate 50. The spacer-insulator layer 60 may be removed after processing to leave a chamber 68, or it may be left intact. Preferably, if the spacer-insulator layer 60 comprises glass or silicon then it is extracted; however, if the spacer-insulator layer 60 comprises porous film, it may be left intact.

Figure 5:
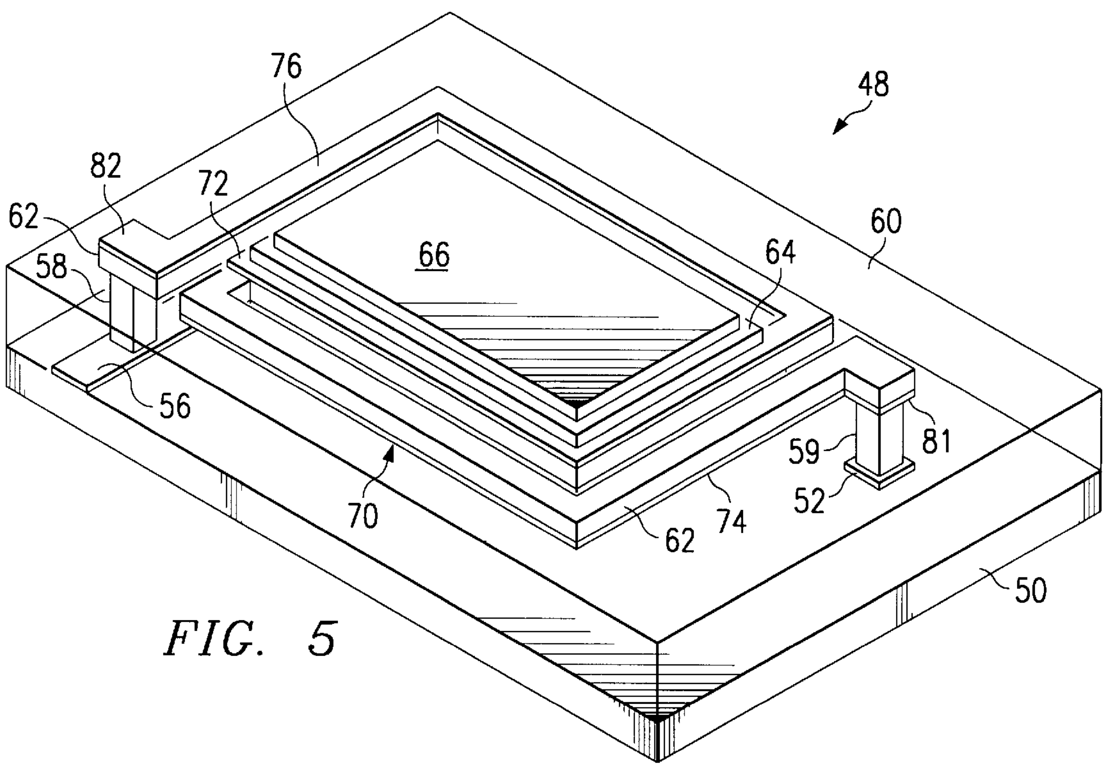
FIG. 5 is an oblique view of the thermal sensor of FIG. 3 with an optical coating comprising a porous film layer and a transparent film.

The spacer-insulator layer 60 should have a height equal to the desired height of the chamber 68 (see FIG. 5). The spacer-insulator layer 60 preferably comprises $SiO_2$ but may also comprise polyimide or a similar type of material compatible with the fabrication process of the thermal sensors 48. A spacer-insulator material is compatible when it will not burn, melt, or interact with other materials during the fabrication of the thermal sensors 48. The spacer-insulator material 60 is also preferably removable by dry etching techniques.

Figure 4:
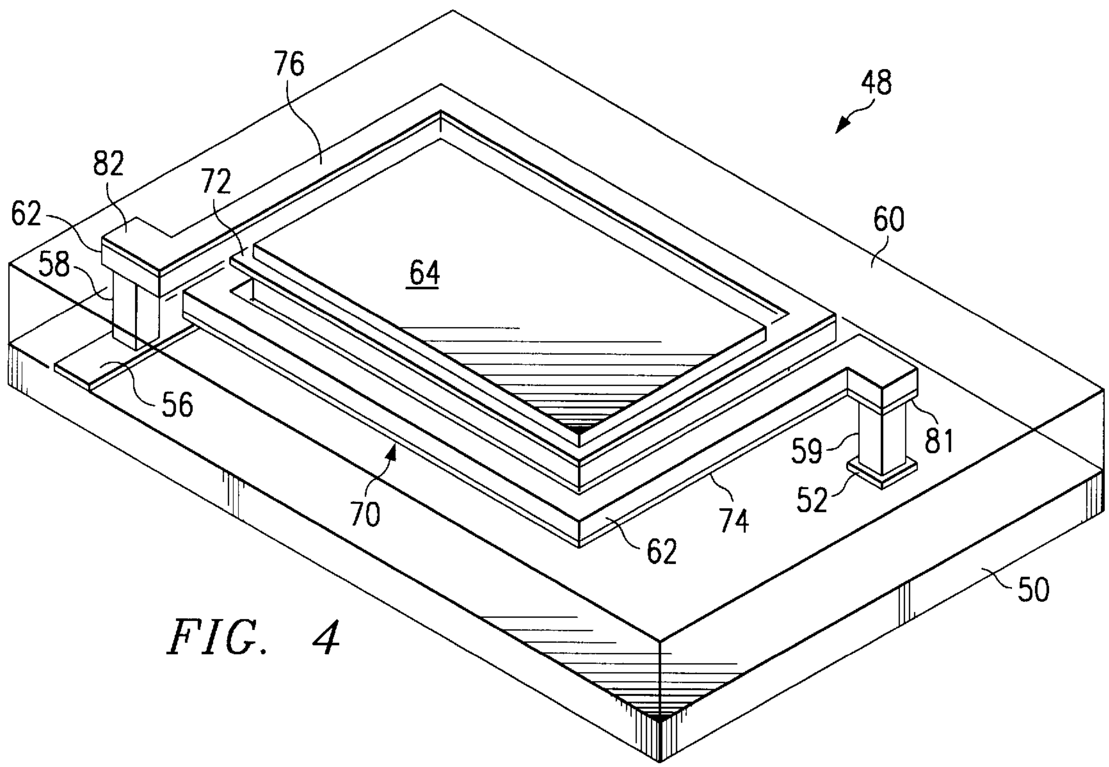
FIG. 4 is an oblique view showing the thermal sensor of FIG. 3 with an optical coating comprising a porous film layer.

Next, vias 54 are etched in the spacer-insulator layer 60 to provide access to contact pads 52 and 56 for each thermal sensor 48. A conductive material layer is deposited over the spacer insulator layer 60 and etched-back, leaving posts 58 and 59 residing where vias 54 were. The posts 58 and 59 provide mechanical support for the subsequent components of the thermal sensor 48 discussed infra. The posts also provide electrical and thermal connection between the substrate contact pads 52 and 56 and the first and second electrodes 70 and 72. The vias 54 are preferably formed using anisotropic etching or other photolithographic techniques. The posts 58 and 59 may be formed by filling the vias 54 with a supporting material, such as aluminum or platinum. However, other types of material may be used for the posts 58 and 59 depending on the type of thermal sensors 48 that are to be fabricated as well as the fabrication process and temperature. The posts 58 and 59 may be, for example, approximately 2.5 micrometers tall. Two posts 58 and 59 are preferably placed catty-corner for each thermal sensor 48 as shown in FIGS. 3, 4 and 5. The posts 58 and 59 shown in the Figures are square, but the posts 58 and 59 may also be polygonal or round. Post 58 may be lengthened to be slightly taller than post 59 to extend it to the second electrode 72. However, posts 58 and 59 may be the same height if a via is used through the thermally sensitive material to connect post 58 to the top electrode.

A first layer of electrically conductive material may next be formed over the spacer-insulator layer 60 and posts 58 and 59. The first layer of electrically conductive material may be formed of various types of materials such as palladium or platinum; however, the present invention allows other types of electrically conductive material to be used depending on the type of thermal sensors 48.

The first layer of electrically conductive material may be reticulated to form first electrode 70 and first support arm 74. Various photolithographic techniques including anisotropic etching processes may be used to reticulate the first layer of electrically conductive material to define first electrode 70, first support arm 74, slot 78, and first electrode contact pad 81. Depending upon the type of material used to form the first layer of electrically conductive material, the anisotropic etching process may include ion milling, reactive ion etch (RIE) or a magnetically enhanced RIE (MERIE). Slot 78 and spaces formed by reticulation may be filled with a temporary filler material 90 if necessary to form a smooth surface upon which the thermally sensitive material may be deposited. The temporary filler material 90 may be the same material used for spacer-insulator material 60, for example. Supportive and electrically conductive post 59 may connect the first electrode contact pad 81 of the first electrode to the contact pad 52 on the integrated circuit substrate 50.

A layer of thermally sensitive material may next be formed over the array of first electrodes 70, support arms 74, temporary filler material 90 and first electrode contact pad 81. The thermally sensitive material preferably comprises pyroelectric materials such as barium strontium titantinate (BST), barium titantinate (BT), and antimony sulfoiodide (SbSI), or any lead-containing ferroelectric material such as lead titantinate (PT), lead zirconate titantinate (PZT), lead lanthanum titantinate (PLT), lead zirconate titantinate (PZT), lead lanthanum zirconate titantinate (PLZT), lead zinc niobate (PZN), lead strontium titaninate (PSrT), and lead scandium tantalate (PST), for example. The selection of material depends upon the type of thermal sensor 48 which will be formed on the integrated circuit substrate 50.

Portions of the thermally sensitive material are then removed to form thermally sensitive element 62 (see FIGS. 3, 4 and 5). The thermally sensitive element 62 acts as a thin film sensor and is preferably less than 1.0 micrometers thick and more preferably approximately 0.25 micrometers thick. The thermally sensitive element 62 may be capable of generating a charge in response to a change in temperature. It will be understood that the present invention contemplates forming the thermally sensitive element 62 from any thermally sensitive material that provides a satisfactory response to thermal radiation. The type of pyroelectric material and the thickness of the porous film 64 may vary depending upon the wavelength of thermal radiation that the thermal imaging system 10 is designed to detect. The thermally sensitive element 62 is preferably a thin film to enhance responsiveness to thermal radiation and transmission of a generated charge to first and second electrodes 70 and 72.

Vias may be formed through underlying layers to reach posts 58 and filled with a conductive material so that posts 58 abut second electrode 72 at the second electrode contact pad 82. Arms are also defined in the thermally sensitive material (see FIG. 3) so that the thermally sensitive element 62 is a self-supported pixel.

A second layer of electrically conductive material may be formed over the thermally sensitive element 62 opposite the first electrode 70 array. The second electrode 72 is formed from the second layer of electrically conductive material. The second layer of electrically conductive material may be formed of the same materials as the first electrically conductive layer, although the present invention allows other types of electrically conductive material to be used depending upon the type of thermal sensors 48 which will be formed on the integrated circuit substrate 50.

The second layer of electrically conductive material is reticulated to form a second electrode 72, second support arm 76, slot 80 and second electrode contact pad 82. Various photolithographic techniques may be used to reticulate the second layer of electrically conductive material to define second electrode 72 and second support arm 76. Spaces formed between second electrodes 72 and second support arms 76 may be filled with a temporary filler 92 to form a smooth surface upon which the precursor film may be deposited. The temporary filler 92 material may, for example, be the same material used for spacer-insulator layer 60. Supportive and electrically conductive post 58 may connect the second electrode contact pad 82 of the second electrode to the contact pad 56 on the integrated circuit substrate 50.

A precursor film 63 is deposited over the second electrode 72. The precursor film 63 is preferably an organometallic silicate solution which may be gelled into a silicon dioxide based xerogel. The precursor film 63 may also comprise liquids that will gel to form silicon dioxide based aerogel, silicon carbide aerogel or xerogel, or other aerogels or xerogels. The precursor film 63 is liquid and is very planar when applied. The precursor film 63 is gelled and dried to form porous film 64 (see FIGS. 3, 4 and 5). The precursor film 63 may be gelled by supercritical or non-supercritical drying. Preferably, the resulting porous film 64 is greater than 80% porous, however, the porous film 64 may also be less than or equal to 80% porous.

The porous film 64 may be utilized in at least two different manners in accordance with the present invention. In the "tuned cavity" approach, a optical impedance matching layer 66 is deposited over the porous film 64 creating a tuned cavity (see FIG. 5) defined by the optical impedance matching layer 66, the porous film 64 and the top electrode 72. Thermal radiation is absorbed by the porous film 64 after reflecting off the top electrode 72, the second electrode 72 preferably being opaque to infrared radiation. The dimensions of the porous film 64 and sheet resistance of optical impedance matching layer 66 may be varied depending upon the wavelength of the thermal radiation that the thermal imaging system 10 is designed to detect. The porous film 64 preferably corresponds to about ¼ of the selected thermal radiation wavelength moderated by the power of the porous film 64. For example, if thermal imaging system 10 is designed to detect thermal radiation having a wavelength of 7.5 to 14 micrometers, the porous film 64 preferably has a height of approximately 1.875 to 3.5 micrometers. The porous film 64 functions as a ¼ wavelength separator material. Because the porous film 64 of the present invention has a low refractive index, it can be used to form a very low mass ¼ wavelength cavity. The optical impedance matching layer 66 of the optical coating, which is electrically conductive, does not absorb the radiation, but rather, the radiation is absorbed by the resonant cavity defined by the second electrode 72 (which acts as a reflector), porous film 64, and optical impedance matching layer 66 (which is somewhat IR transparent) over the porous film 64.

In the "black gold" approach, rather than the porous film providing a tuned cavity, thermal radiation is absorbed by the porous film 64. The porous film 64 microstructure is controlled during gelling and drying. This "black gold" method of absorption eliminates the need for a optical impedance matching layer 66 over the porous film 64. The porous film 64 on each sensor 48 absorbs the infrared radiation impinging on the thermal detector 16. The microstructure of porosity of the porous film 64 may be controlled so that the desired wavelength of radiation is absorbed and then converted to heat which is transferred to the thermally sensitive element 62. Rather than functioning as a ¼ wavelength spacer or cavity material, the porous film 64 has very small channels of interconnected porosity. When light travels through the channels, it bounces off the pore walls and small corridors until eventually all the radiation is absorbed.

A final optional step is to extract the spacer-insulator material 60 and temporary fillers 90 and 92. The spacer-insulator layer 60 and temporary filler material 90 used to construct the thermal detector 16 may be removed to create an array of sensors 48 fully supported by the posts 58 and 59.

In either embodiment the two electrodes 70 and 72 are preferably opaque, rather than transparent. This eliminates the difficult fabrication steps required to produce transparent electrodes, including high temperatures which challenge the underlying integrated circuit substrate 50 maximum temperature. However, the electrodes 70 and 72 may be transparent and may be comprised of LSCO (lanthanum strontium cobalt oxide), for example.

There are many optional features of the present invention and alternative methods of manufacturing. For example, a barrier layer (not shown) may be formed between the electrically conductive electrodes 70 and 72 and the thermally sensitive element 62. A barrier layer may be desired, when, for example, the material of electrodes 70 or 72 is not compatible with the thermally sensitive elements 62. In such a case, the electrodes 70 or 72 may communicate with the thermally sensitive elements 62 through the barrier layer.

Several other features are preferred in the present invention. Thermal sensor 48 is preferably a thin-film sensor that is self-supported (with built-in arms) above the integrated circuit substrate 50. As shown by FIG. 4, the first support arm 74 preferably extends from the first electrode 70. The second support arm 76 preferably extends from the second electrode 72. The first support arm 74 preferably comprises the same type of material as the first electrode 70. Similarly, the second support arm 76 preferably comprises the same type of material as the second electrode 72. Thermally sensitive element 62 is disposed above first support arm 74 and below second support arm 76.

The length, width, and thickness of the support arms 74 and 76 and thermally sensitive element 62 may be selected to enhance their resistance to the transfer of thermal energy between the thermal sensor 48 and the integrated circuit substrate 50. For example, slots 78 and 80 may be formed between each support arm 74 and 76 and its respective electrode 70 and 72 to bifurcate the support arms 74 and 76 and their associated electrode 70 and 72 (see FIGS. 3, 4, and 5). The thermal isolation of each support arm 74 and 76 may be increased by lengthening the bifurcated support arm 74 and 76. Thermal isolation may be maximized by fully extending each support arm 74 and 76 along opposite halves of the perimeter of the electrodes 70 and 72, as shown. The $R_{th}$ may also be increased by reducing the cross sectional area.

The posts 58 and 59 support the bifurcated support arms 74 and 76 and arms of thermally sensitive element 62, in space relation with the surface of the integrated circuit substrate 50. The posts 58 and 59 may each support one of the bifurcated support arms 74 and 76 and arms of thermally sensitive element 62. The posts 58 and 59 are preferably formed from material which is electrically conductive, such as aluminum, and are preferably about 2.5 micrometers tall. In this embodiment, post 58 and 59 may transmit electrical signals from its respective electrode 70 and 72 to a contact pad 52 of the integrated circuit substrate 50. Thus, the posts 58 and 59 provide both mechanical support and a signal flow path to the associated contact pad 52.

Various techniques may be used to form thin film layers 60, 62, 66, 70 and 72. Often these techniques are divided into two groups—film growth by interaction of a vapor deposited species with an associated substrate and film formation by deposition without causing changes to the associated substrate. The first group of thin film growth techniques includes thermal oxidation and nitridation of single crystal silicon and polysilicon. The formation of silicides by direct reaction of a deposited metal and the substrate is also frequently included in this first group of thin film growth techniques.

The second group of thin film growth techniques may be further divided into three subclasses of deposition. The first subclass is often referred to as chemical vapor deposition (CVD) in which solid films are formed on a substrate by the chemical reaction of vapor phase chemicals which contain the desired constituents for the associated thin film layer. The second subclass is often referred to as physical vapor deposition (PVD) in which the desired thin film layer is physically dislodged from a source to form a vapor and transport it across a reduced pressure region to the substrate. The dislodged layer is then condensed to form the desired thin film layer. The third subclass typically involves coating the substrate with a liquid which is then dried to form the desired thin film layer. The formation of thin film layers by PVD includes such processes as sputtering, evaporation and molecular beam epitaxy. Spin coating is one of the most commonly used techniques for depositing liquids on a substrate to form a thin film layer.

Thin film layers may also be satisfactorily grown in accordance with the teachings of the present invention by using techniques such as sputtering, dipping, vapor phase deposition, metal organic chemical vapor deposition (MOCVD), and sol/gel or metal oxide decomposition (MOD) by spin coating. Processes should be selected to establish the desired electrical and thermal characteristics for the resulting thermal sensors 48. Additionally, depending upon the type of materials used to form 60, 62, 66, 70 and 72, one or more buffer layers or protective layers (not shown) may be disposed between surface of integrated circuit substrate 50 and/or layers 60, 62, 66, 70, and 72.

The various techniques may be integrated to allow fabrication of the thermal sensors 48 on integrated circuit substrate 50 using processes associated with the manufacture of very large scale integrated circuits. Material usage and overall process efficiency associated with fabricating a focal plane array 16 may be substantially improved. For example, the thermally sensitive layer is preferably formed with approximately the same thickness as desired for thermally sensitive elements 62. Thus, the possibility of polishing damage associated with previous techniques used to form thermal sensitive elements from pyroelectric materials have been substantially reduced or eliminated.

While forming the desired layers of material 60, 62, 66, 70, and 72 on the surface of the integrated circuit substrate 50 and the posts 58 and 59 in the layers, individual thermal sensors 48 may be defined on the integrated circuit substrate 50. As previously discussed, the spacer-insulator layer 60 can be removed during processing leaving cavity 68. Any filler material between the electrodes and support arms in the first layer may also be removed. Various photolithographic techniques including anisotropic etching processes may be used to define the desired thermal sensors 48. Depending upon the type of materials used to form layers 60, 62, 66, 70, and 72, the anisotropic etching processes may include ion milling, reactive ion etch (RIE) or a magnetically enhanced RIE (MERIE).

The novel invention of an optical coating including a porous film has several advantages over the prior art. One advantage of the present invention is that it establishes a ¼ wavelength cavity through the use of porous film. A porous film over the top electrode of each sensor in an array solves many problems of prior art designs. The use of a porous film, the requirement that the top and bottom pyroelectric capacitor electrodes be infrared-transparent is eliminated. Therefore, the difficult fabrication steps required for a semi-transparent metal layer are eliminated. Infrared transparent layer fabrication and temperature difficulties are overcome with the use of a porous film 64 optical coating. Thinner and more responsive thermal sensors 48 are possible with an optical coating consisting of a porous film 64 and optical impedance matching layer 66, which replaces the use of the thermally sensitive dielectric 62 as ¼ wavelength separator material. Sensors 48 are more responsive when they consist of lower thermal mass resulting in improved acuity of the image produced by the system. Porous material has a very low thermal mass and therefore its use as the ¼ wavelength material as opposed to another material allows for better response to thermal radiation. The use of a porous film also allows for easy selection of wavelength of absorbed radiation.

While this invention has been described with reference to illustrative embodiments, this description is not intended to be construed in a limiting sense. Various modifications and combinations of the illustrative embodiments, as well as other embodiments of the inventions, will be apparent to persons skilled in the art upon reference to the description. It is therefore intended that the appended claims encompass any such modifications and embodiments.

What is claimed is:

1. A thermal detector comprising:

a substrate;

a support means;

a first electrode above said substrate and said support means;

a thermally sensitive element over said first electrode;

a second electrode over said thermally sensitive element; and an optical coating comprising a porous film over said second electrode;

wherein said support means provides thermal isolation and electrical connectivity between at least said first electrode, said second electrode and said substrate, wherein said thermally sensitive element comprises a self-supporting means.

2. The thermal detector of claim 1 wherein said support means comprises:

at least two posts disposed on said substrate adjacent said first and second electrodes, wherein said support posts are attached to said first and second electrodes.

3. The detector of claim 1, wherein said porous film is a material selected from the group consisting of xerogels and aerogels.

4. The detector of claim 3, wherein said porous film comprises silicon.

5. The detector of claim 1, wherein said porous film has a porosity greater than 80%.

6. The detector of claim 5, wherein said porous film has a porosity greater than 99.9%.

7. The detector of claim 1 wherein said first and second electrodes are opaque to infrared wavelengths.

8. The detector of claim 1, wherein said thermally sensitive element is greater than zero and less than 1.0 micrometers thick.

9. The thermal detector of claim 1 wherein said first and second electrodes each comprise:

a sensing electrode;

a support arm comprising first and second ends, wherein said first end of said support arm is attached to said sensing electrode; and a contact pad attached to said second end of said support arm;

wherein said support means is adjacent said contact pad of each of said first and second electrodes.

10. A thermal detector comprising:

a substrate;

a support means;

a first electrode above said substrate and said support means;

a thermally sensitive element over said first electrode;

a second electrode over said thermally sensitive element;

an optical coating comprising a porous film over said second electrode; and an optical impedance matching layer over said porous film, wherein said support means provides thermal isolation and electrical connectivity between at least said first electrode, said second electrode and said substrate.

11. A method for fabricating a thermal detector, comprising the steps of:

providing a substrate;

depositing a spacer-insulator material on said substrate;

providing a support means;

depositing a first conductor layer over said spacer-insulator layer and said support means;

patterning said first conductor layer to form a bottom array of electrodes;

depositing a thermally sensitive layer over said electrodes;

patterning said thermally sensitive layer to form thermally sensitive elements;

depositing a second conductor layer over said thermally sensitive elements;

patterning said second conductor layer to form a top array of electrodes;

depositing a precursor film on said second conductive layer;

gelling said precursor film to form a porous film; and depositing an optical impedance matching layer over said porous film.

12. The method of claim 11, wherein said step of gelling said precursor film results in a porous film having a porosity greater than 80%.

13. The method of claim 12, wherein said step of gelling said precursor film results in a porous film having a porosity greater than 99.9%.

14. The method of claim 11, further comprising the step of removing said spacer-insulator material after said gelling step.

15. A method for fabricating a thermal detector, comprising the steps of:

providing a substrate;

depositing a spacer-insulator material on said substrate;

providing a support means;

depositing a first conductor layer over said spacer-insulator layer and said support means;

patterning said first conductor layer to form a bottom array of electrodes;

depositing a first temporary filler material over said bottom array of electrodes;

depositing a thermally sensitive layer over said electrodes;

patterning said thermally sensitive layer to form thermally sensitive elements;

depositing a second conductor layer over said thermally sensitive elements;

patterning said second conductor layer to form a top array of electrodes;

depositing a second temporary filler material over said top array of electrodes;

depositing a precursor film on said second conductive layer; and gelling said precursor film to form a porous film.

* * * * *